(12) United States Patent
Artoni

(10) Patent No.: US 7,077,966 B2
(45) Date of Patent: Jul. 18, 2006

(54) PROCESS FOR GELATINES EXTRACTION AND CHROMIUM SALTS RECOVERY FROM TANNED HIDES AND SKINS SHAVINGS

(75) Inventor: Giancarlo Artoni, Chiampo (IT)

(73) Assignee: Artoni S.A.S. Di Artoni Giancarlo & Co., Chiampo (IT)

( * ) Notice: Subject to any disclaimer, the term of this patent is extended or adjusted under 35 U.S.C. 154(b) by 579 days.

(21) Appl. No.: 10/451,501

(22) PCT Filed: Dec. 21, 2001

(86) PCT No.: PCT/EP01/15252

§ 371 (c)(1),
(2), (4) Date: Jun. 20, 2003

(87) PCT Pub. No.: WO02/051956

PCT Pub. Date: Jul. 4, 2002

(65) Prior Publication Data

US 2004/0030102 A1 Feb. 12, 2004

(30) Foreign Application Priority Data

Dec. 22, 2000 (IT) .............................. MI00A2802

(51) Int. Cl.
*B01D 1/68* (2006.01)

(52) U.S. Cl. ..................................... 210/749

(58) Field of Classification Search ............ None
See application file for complete search history.

(56) References Cited

U.S. PATENT DOCUMENTS

| 1,340,721 A | 5/1920 | Lamb |
| 2,286,038 A | 6/1942 | Pierson |

FOREIGN PATENT DOCUMENTS

| DE | 21 36 769 A | 2/1973 |
| WO | WO 93/14170 | 7/1993 |
| WO | WO 93/17970 | 9/1993 |

*Primary Examiner*—Jean C. Witz
(74) *Attorney, Agent, or Firm*—Stetina Brunda Garred & Brucker (57) ABSTRACT

The present invention refers to a continuous process for gelatines production and chromium recovery from tanned hides and skins shaving, containing trivalent chromium. The claimed process consists in an acid hydrolysis followed by separations of the various products, wherefrom three major components are obtained: gelatine from collagen, tanning chromium salt, used for hides and skins tanning, and the hydrolysing agent. The gelatines obtained can be used as adhesives in various industrial sectors, i.e. from the industry of abrasives to the paper and cardboard industry, to bookbinding, to the industry of dyes and plasters, to the production of matches. The chromium salts obtained can be recovered and reused in the tanning industry; the hydrolysing agent may be recycled.

21 Claims, 4 Drawing Sheets

FLOW DIAGRAM

FIGURE 4

PROCESS FOR GELATINES EXTRACTION AND CHROMIUM SALTS RECOVERY FROM TANNED HIDES AND SKINS SHAVINGS

FIELD OF THE INVENTION

The present invention refers to a process for gelatine extraction and chromium salts separation from tanned hides and skins, with recovery of the hydrolysing agent.

TECHNICAL NOTE

The environmental impacts of hides and skins tanning are most significant since the process produces large amounts of hardly disposable wastes and uses highly polluting heavy metals, such as chromium. Therefore, the disposal of by-products of the tannery industry is a real problem. The methods of disposal adopted so far are the following: waste disposal in authorised landfills, non-differentiated waste incineration in bulk, and waste conversion—though in very low amounts—into nitrogen fertiliser. However, said methods do not solve the problem, but make it more serious: in fact, the wastes from the tannery industry contain approx. 3% chromium, which, though trivalent, is a heavy metal and tends to accumulate. Therefore, when said wastes are disposed of in landfills or are used for the production of nitrogen fertiliser, they cause serious soil pollution problems. Incineration is not advisable at all as it brings about the formation—by high temperature oxidation—of highly toxic hexavalent chromium and other combustion by-products, also in the gas phase, which are polluting and toxic to varying degrees.

On the other hand, as suggested by the attempts made to dispose of wastes through the so-called "leather torrefaction"—which gives nitrogen fertiliser—most by-products, after adequate treatments, may be of high economic value from the recycling viewpoint. It is common knowledge that by-products of the tannery industry can give technical-grade gelatines as well as chromium, which, if recovered appropriately, may be reused in hides and skins tanning. In fact, most of said by-products consist of collagen-derived protein materials, which can yield different gelatines having a wide range of industrial application. Except for the foodstuff or pharmaceutical industries, for which the use of products from tannery is forbidden, technical-grade gelatines are widely used especially as adhesives in many other industrial sectors, e.g. in the industry of dyes and plasters, of matches and abrasives, textiles, paper and cardboard, and bookbinding.

Traditionally, the most widely used process for technical-grade gelatines production from by-products derived from hides and skins splitting, consists in practice as example a treatment with 15% limewash and in the washing with running water, followed by lime residues neutralisation with acids and gelatines extraction in water at a temperature of 80° to 100° C. However, this process is characterised by a very high water consumption (up to 80 m3/hr) as well as by the production of poor-quality technical-grade gelatines. Furthermore, the sector of technical-grade gelatine production has now to face a difficult situation, i.e. the scarce availability of starting by-products, mostly due to the present trend to locate said productions in developing countries. However, the technical-grade gelatines produced in developing countries not always comply with the technical specifications requested by product users.

Instead, tanned hides and skins shaving is sufficiently, if not abundantly, available in industrialised countries, where other problems arise in connection with shaving disposal and by-products recovery for recycling (collagen gelatine and chromium). To this end, several processes for gelatines production from low-chromium-content collagen have been developed: they are mostly based on alkaline hydrolysis with hot strong alkalis, gelatine extraction, chromium insolubilisation, followed by successive separations. In other processes, alkaline hydrolysis is preceded by chromium removal from the hides and skins shaving with acid chemical agents capable of binding trivalent chromium and by the separation of same by precipitation. In still further processes, hydrolysis is followed by the oxidation of the trivalent chromium residue to hexavalent chromium and by the separation of same. Said processes for the obtainment of low-chromium content gelatines, based on treatments with alkaline reagents for collagen hydrolysis and chromium separation, are multi-stage and therefore hardly applicable to the industrial sector. However, alkaline treatments give low-quality gelatines and bring about the production of ammonia by the amidic group degradation.

It is, therefore, a major object to develop a process, easily applicable to industrial plants, which, starting from tanned hides and skins shaving containing Cr(III), might allow— through few steps—the obtainment of choice collagen gelatines in high yields as well as chromium salts that may be recovered and reused in industrial plants. Consequently, the problem arising from their disposal would be minimised. It is a further object to develop an industrially efficient production process having no environmental impact, which, therefore, may envisage a complete reuse of its by-products (wastewaters and hydrolysing agent), and does not generate polluting gas emissions.

SUMMARY

A surprisingly advantageous process according to the objects of the present invention has been developed by the Applicant. The process—involving few steps and no alkaline treatment—gives a choice product (gelatines) with good Bloom mechanical resistance, which, therefore, may be used for industrial purposes, and allows the recovery, from tanned hides and skins shaving, of chromium, which may be reused in the tanning industry. From an industrial point of view, the claimed process also allows the recovery of its by-products (hydrolysing agent and water), and from an environmental point of view it is compatible with environmental impact requirements. Hence it complies with the objects of the present invention.

Therefore, it is an object of the present invention to provide a process characterised by acid hydrolysis of tanned hides and skins shaving, containing chromium(III), at a pressure below the atmospheric and at relatively low temperatures.

The process for gelatines production and chromium salts recovery, object of the present invention is characterised at least by the following steps:
 a) organic acid hydrolysis of tanned hides and skins shaving products at temperatures to 100° C.;
 b) extraction of the raw gelatine in solution obtained after hydrolysis by filtration with recycling of non-hydrolysed products, if any, to hydrolysis;
 c) gelatine and chromium salts separation by desalination over ion exchange resins.

Further objects of the present invention are i) recovery of the acid hydrolysing agent and water for recycling and ii) total chromium recovery after desalination by ion resins selective regeneration.

DETAILED DESCRIPTION OF THE INVENTION

As shown in the flow diagram of FIG. 1, the process for gelatines production and chromium salts recovery from tanned hides and skins shaving, forming the object of the present invention, is continuous type and consists in the following steps:

a) organic acid hydrolysis of tanned hides and skins shaving products at temperatures to 100° C.;
b) dilution with water of the material resulting from the first hydrolysis;
c) extraction of the raw gelatine in solution obtained after hydrolysis by mechanical filtration with recycling to hydrolysis of non-hydrolysed products, if any;
d) gelatine separation from chromium salts and clarification of the same by desalination carried out by filtration through ion exchange resins;
e) concentration, cooling and drying of the resulting gelatine and water recycling;
f) concentration of the chromium salts obtained by ion exchange filters standard regeneration, by evaporation in vacuo with recovery of chromium salts and of water to be recycled.

As reported in the Summary, the essential production steps characterising the whole process are: acid hydrolysis in an aqueous medium of tanned hides and skins shaving products; raw gelatine extraction by filtration of the hydrolysate in solution; gelatine separation by desalination over ion exchange resins with gelatine clarification and chromium separation.

Figure 1:
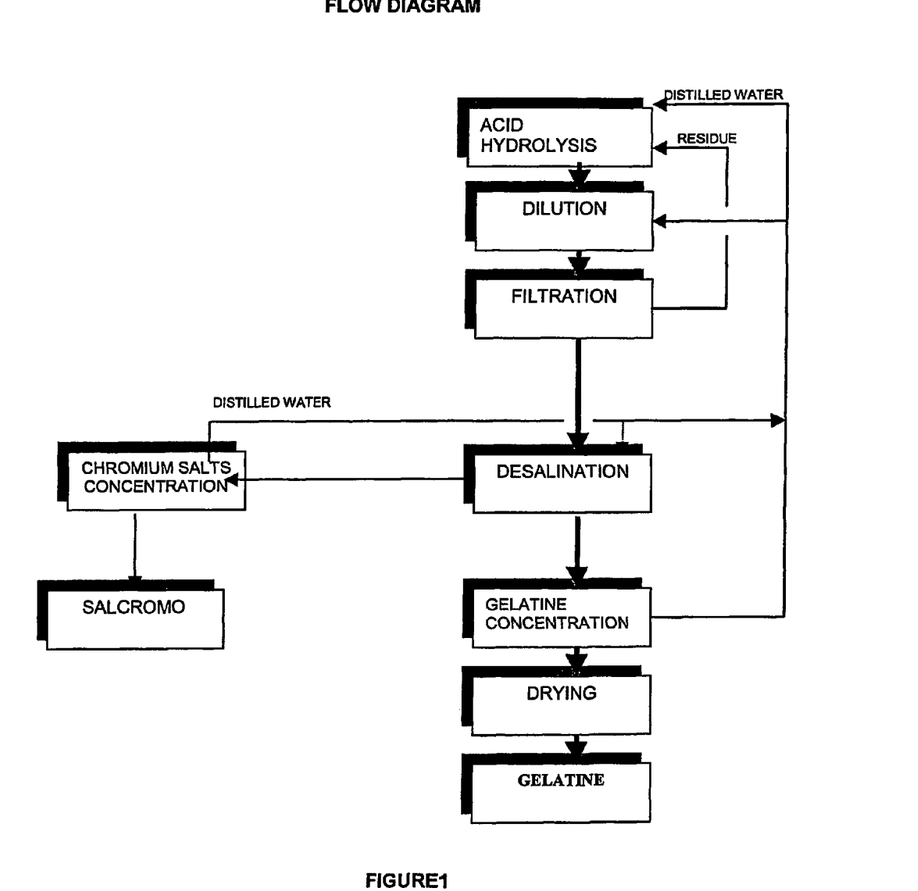

A detailed description of the production steps indicated in the flow diagram of FIG. 1 is given hereinbelow.

Acid Hydrolysis

Tanned hides and skins shaving products having an average moisture content of approximately 55%, which otherwise would be disposed of, are sent to plant storage areas, wherefrom they are conveyed and fed to reaction tanks, provided with products weighing means. On the basis of the amount of products loaded, through a preset programme, an electronic control system calculates the amount of reagents to be fed (water and acids). To favour hydrolysis, the mass may be maintained under continued stirring.

The quantity of acids is predetermind at 10 to 80% wt/wt in respect of the weight Of shaving as it is, with an averag moisture content of approx. 55%. Water is fed at room temperature in a water weight ratio ranging from 4 to 10 times the weight of shaving as it is, having an average moisture content of approximately 55%.

The hydrolysing agents preferably used for acid hydrolysis are organic acids selected from the group consisting of monocarboxylic, polycarboxylic, hydroxy acids, such as for example formic, lactic, citric, EDTA, tartaric acids and equivalent acids, the salts and mixtures thereof. Optionally, the organic acids, both salified and as mixtures thereof, may be added with mineral acids, such as for example sulphuric, phosphoric and equivalent acids in an amount of 5 to 20% in respect of the shaving mass.

The mass in the tank is heated to a temperature up to 100° C. and the time of residence under said temperature conditions is from 0.5 to 30 hours. By way of example, the mass may be heated with steam at a pressure of 0.5 to 1 bar.

The temperature and the time of residence under the selected temperature conditions influence the hydrolysis of the protein material and, consequently, the quali- and quantitative yield of the gelatine produced. To a higher temperature and longer time corresponds a gelatine in higher yields, but of poorer quality, measured as mechanical resistance index (Bloom's parameter). It follows that the process physical parameters are to be fixed on the basis of the type of gelatine to be produced.

Continuous mass mixing by blade or anchor stirrer favours the hydrolysis kinetics and increases the yield.

Raw Gelatine Dilution and Extraction by Filtration

Once acid hydrolysis has been performed, the mass in the reaction tank is added with the water necessary for the other steps. The hydrolysed protein fraction, which consists of raw gelatine, is separated from the solid mass fraction consisting of non-hydrolysed shaving products, by filtration with mechanical filtering means, such as for example, centrifugal separators, drum filters, bag filters, filter press, rotational separators and equivalent means. The solid mass is defined as unreacted solid residue. The protein fraction hydrolysed in solution, which contains raw gelatine, is conveyed to the successive steps, while the solid fraction is recycled to hydrolysis. The hydrolysis/filtration sequence may be repeated on the chromium solid residue to extract the greatest possible, if not the whole amount of gelatine. The gelatine qualitative yields are constant independently of the increase in number of the xtraction cycles.

Gelatine Separation by Desalination

The raw gelatine solution obtained by mechanical filtration contains the hydrolysing agent, chromium salts and impurities, such as ashes, in amounts exceeding the allowable limits provided for by the technical specifications of the product for industrial use.

The raw gelatine solution is subjected to desalination to simultaneously free the solution from water, acid hydrolysing agents and chromium salt residues and to abate ashes, without significant protein substances losses. The purification takes place by filtration through ion, cation and anion or mixed-bed exchange resins, selective for trivalent chromium. Resin filters are periodically regenerated to extract the captured chromium salts. The regeneration solution is then recycled to the separated chromium salts concentration step.

Concentration, Cooling and Drying

The resulting gelatine solution is fed to a multiple-effect evaporator and then coooled and dried, e.g. in air dryers.

Chromium Salts Concentration

The chromium salts solution, containing trivalent chromium salts, obtained by resins regeneration of the desalination step, is concentrated by evaporation preferably in vacuo, to give a concentrate, utilised by salcrome manufacturers for tanning, and water which is recycled.

With a view to improving the process yields and efficiency, the claimed process for gelatines and chromium salts production may optionally include, after acid hydrolysis (step a) and after raw gelatine filtration (step c), the following steps:

gelatine separation from chromium salts and clarification by dialysis across membranes;
chromium salts separation by diafiltration through membranes with separation from the hydrolysing agent of the first step and recycling of the same.

The above optional steps allow the obtainment of gelatine of higher quality and the recovery of chromium-free hydrolysing agent, which may be recycled again. The gelatine solutions obtained in the first dialysis may be sent to desalination or directly concentrated and dried as previously described.

Figure 2:
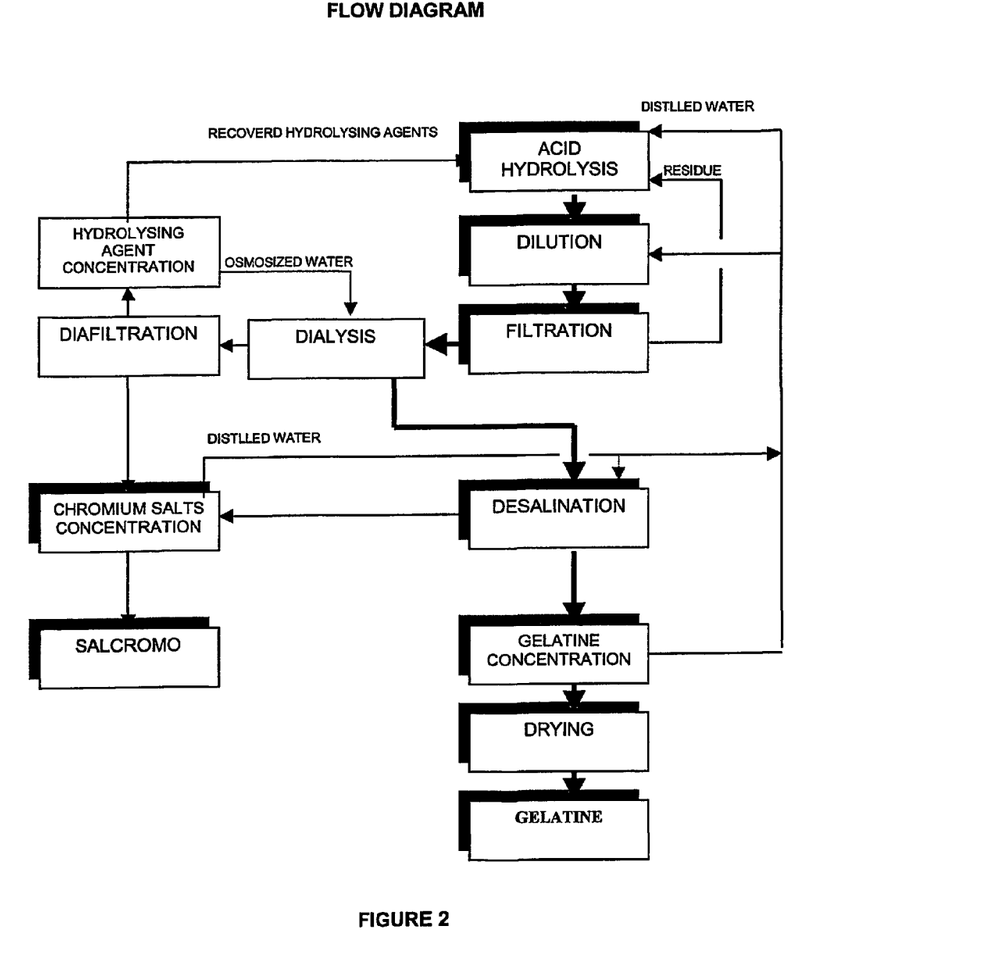

As shown in detail in the flow diagram of FIG. 2, the process forming the object of the present invention, is continuous type and includes the following steps:
a) organic acid hydrolysis of tanned hides and skins shaving products at temperatures to 100° C.;
b) dilution with water of the product obtained from the first hydrolysis;
c) extraction of raw gelatine in solution obtained after hydrolysis by mechanical filtration and recycling of non-hydrolysed products, if any, to hydrolysis;
d) gelatine separation by dialysis across selective membranes for gelatine clarification and separation from chromium salts;
e) gelatine desalination by filtration of the chromium residue through resins;
f) concentration, cooling and drying of the gelatine separated and water recycling;
g) chromium separation by diafiltration through membranes selective for chromium salts with separation from the hydrolysing agent of the first step;
h) concentration of the hydrolysing agent over selective membranes with recovery of the same and of water to be recycled;
i) concentration of chromium salts obtained by diafiltration and ion exchange filters regeneration, by evaporation in vacuo with recovery of chromium salts and water to be recycled.

The essential production steps characterising the whole process are: acid hydrolysis of tanned hides and skins shaving products; raw gelatine extraction by filtration of the hydrolysate in solution; gelatine separation from chromium and clarification by dialysis, diafiltration of the solution containing chromium salts.

The optional steps included in the flow diagram of FIG. 2 are described in detail hereinbelow. The basic steps are as described above.

Gelatine Separation by Dialysis

The raw gelatine solution obtained by mechanical filtration may be optionally subjected to dialysis before desalination. By portionwise water addition, dialysis allows the simultaneous removal of acid hydrolysing agents and chromium salts from the water solution and the abatement of ashes, without significant protein losses. The filtering means used for dialysis are porous membran s with molecular sieves of 1,000 to 30,000 dalton, which retain protein molecules of approx. 50,000 dalton and do not retain low-ionic-charge molecules, such as chromium salts and acids. The acid solution recovered from dialysis Is sent to the recovery of the hydrolysing solution and chromium salts.

Chromium Salts Separation by Diafiltration

The solutions containing the chromium salts and hydrolysing agent recovered from dialysis are diafiltered through selective membranes, to separate chromium salts from the hydrolysing agent. Diafiltration uses filtering means with porous membranes with molecular sieves of 200 to 500 dalton, which retain the bi-trivalent ion species and do not retain low-ionic-charge molecules, such as the hydrolysing agent. The two fractions are recovered after an appropriate concentration. The hydrolysing agent is recovered up to 70%.

Hydrolysing Agent Concentration

The hydrolysing agent is recovered and recycled to hydrolysis after concentration, which may be performed with reverse osmosis membranes or with evaporators in vacuo. The water recovered is recycled.

Chromium Salts Concentration

The chromium salts solutions, which contain trivalent chromium, obtained by diafiltration and resins washings of the desalination step, are concentrated by evaporation in vacuo, as previously described. The concentrate obtained is utilised by salcrome manufacturers for tanning. Water is recycled.

With a view to efficiently recovering—from an industrial standpoint—mainly the chromium separated and secondarily the hydrolysing agent, the claimed process, after desalination optionally includes a particular type of ion exchange regeneration, meant for:
decreasing the consumption of reagents used in ion exchange filters regeneration;
producing a more concentrated chromium salts solution that does not require a further concentration, thereby reducing the volumes to be concentrated and effecting a saving in energy.

Figure 3:
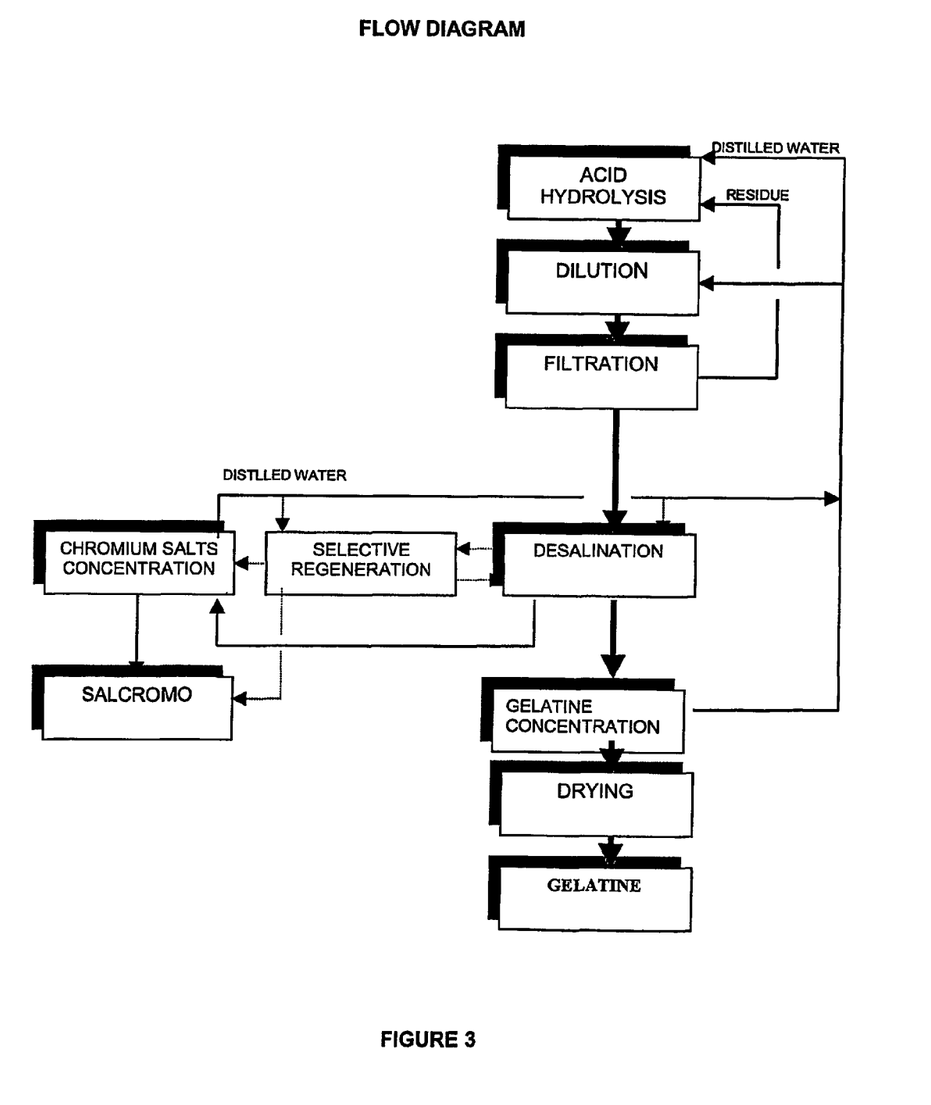

As shown in the flow diagram of FIG. 3, the claimed process is continuous typ and includes the following steps:
a) organic acid hydrolysis of tanned hides and skins shaving products at temperatures to 100° C.;
b) dilution with water of the material obtained by the first hydrolysis;
c) extraction of the raw gelatine in solution obtained after hydrolysis by mechanical filtration with recycling of non-hydrolysed products, if any, to hydrolysis;
d) gelatine desalination by filtration of the chromium residue through resins;
e) selective regeneration of ion exchange filters;
f) concentration, cooling and drying of the gelatine separated and water recycling.

The optional steps included in the flow diagram of FIG. 3 are described in detail hereinbelow. The basic steps are as described above.

Selective Regeneration of Ion Exchange Filters

Whenever ion exchange filters lose their ability to retain salts, they must be regenerated by means of adequately diluted acid and alkaline regenerants and of successive washings. The technique adopted here consists in the separation of three regeneration phases, denominated head, core, and tail, where:
the head is poor in regenerant and chromium salts;
the core is poor in regenerant, but is rich in chromium salts, and forms the concentrated phase;
the tail is rich in regenerant and poor in chromium salts.

Head and tail are combined and, by fresh regenerant make up, reconstitute the regenerating solution for the next regenerating cycles.

The core consists of a solution with a chromium content of 2 to 4% by wt., which does not need any further concentration.

Figure 4:
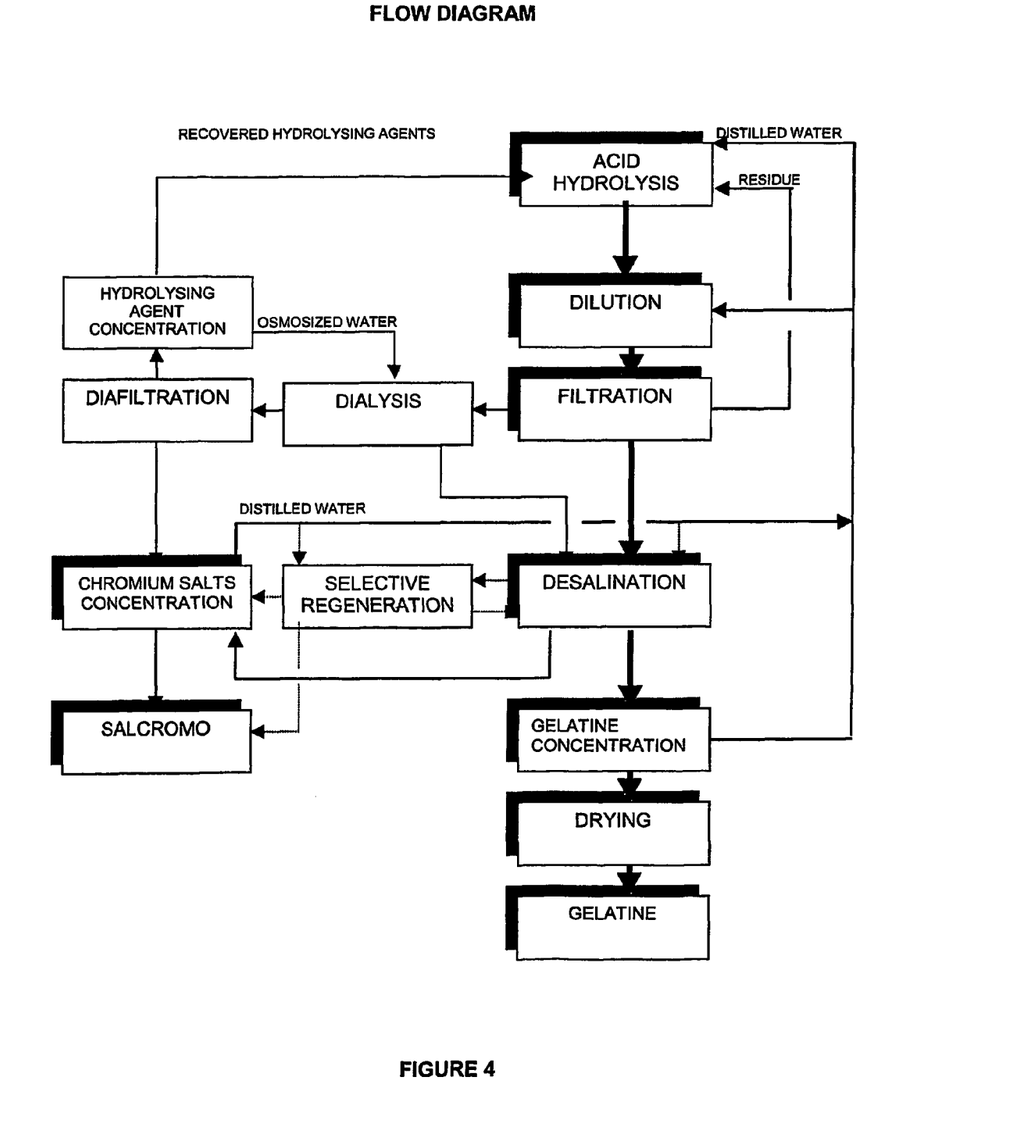

The consumption of regenerant (both alkaline and acid) is thereby reduced by approx. 50%, while the volume of exhaust wash waters, which still contain chromium salts and, therefore, must be concentrated, Is reduced by approx. 70%. The continuous process for gelatines production and the complete recovery of chromium salts, as well as of the hydrolysing agent and water, which consists of all steps previously described, also includes the following steps, as reported in the flow diagram of FIG. 4:
a) organic acid hydrolysis of tanned hides and skins shaving products at temperatures to 100° C.;
b) dilution with water of the material obtained by the first hydrolysis;

c) extraction of the raw gelatine in solution obtained after hydrolysis by mechanical filtration and recycling to hydrolysis of non-hydrolysed products, if any;

d) gelatine separation by dialysis across selective membranes for gelatine clarification and separation of the same from chromium salts;

e) chromium separation by diafiltration through membranes selective for chromium salts with separation from the hydrolysing agent of the first step;

f) concentration of the hydrolysing agent over selective membranes with recovery of the same and of water to be recycled;

g) gelatine desalination by filtration of the chromium residue through resins;

h) concentration, cooling and drying of the gelatine separated;

i) selective regeneration of ion exchange filters;

j) concentration of the chromium salts obtained by diafiltration and ion exchange filters regeneration, by evaporation in vacuo with recovery of chromium salts and of water to be recycled.

The following examples concerning gelatines preparation and chromium salts and hydrolysing agent recovery on the basis of the claimed process, are conveyed by way of illustration, not of limitation of the present invention.

EXAMPLE 1

Acid Hydrolysis, Filtration and Desalination

A 200 l reactor was fed with shaving (10 kg) containing 56% moisture and approx. 2% trivalent chromium, with 20–30% by wt. citric acid solution (6 kg) and distilled water (34 kg). Shaving was allowed to hydrate at room temperature for some hours and stirred by an anchor stirrer. The reaction mass was heated to 20° C. with continued stirring by an anchor stirrer and slight air bubbling to favour mixing. Hydrolysis was started by steam modulation in the reactor jacket. After 2-hr heating to 80–90° C., hydrolysis of the shaving was obtained. The resulting product was diluted with distilled water in a ratio equal to 1:1 by wt. to give a solution (90 l) at 60° C., with 9% glue weight.

Filtration, which was carried out with 100 micron felt vessel mechanical bag filter instead of a centrifuge, had been preceded by a first rough filtration using a 400 micron filtering bag and a further dilution thermostated at 50° C. in a batch reactor. Filtration gave a 100 micron hydrolysate solution and approx. 3–4% unreacted residue (on a dry basis).

Hydrolysis yield referred to shaving as it is: 83% by wt.

A portion of gelatine obtained by acid hydrolysis and filtration was desalted by causing it to pass in two columns containing weak anion resin and strong cation resin (150 ml each). In particular, gelatine (380 ml) was diluted with distilled water (1:1) and caused to pass in two columns containing anion resin A100 and cation resin C150 (150 ml), regenerated and preheated to 180° C. with water. This operation was performed with diluted gelatine at 50° C. at a specific rate of 5 BV (Bed Volume). The resulting solution was concentrated in vacuo.

Desalination gave a gelatine solution exhibiting:

glue weight: 16%; sp. gr.: 1.034 at 40° C.; viscosity: 115.4 mpoise at 40° C.

Solution drying gave a gelatine exhibiting the following characteristics:

Bloom: 421; viscosity: 127 mpoise; citric acid: n.d.; Cr(III): 0.15% by wt.; moisture content: 17%; ashes content at 560° C.: 1.1%.

EXAMPLE 2

Acid Hydrolysis, Filtration and Desalination

A laboratory flask was fed with shaving (50 g) containing 56% moisture and approx. 2% trivalent chromium, and with 9 to 10% lactic acid solution (400 ml). Once the mass had been hydrated for some hours at room temperature under stirring by an anchor stirrer, it was hydrolysed (96%) at approx. 90° C. for 30 min., then diluted with distilled water (1:1) at room temperature and filtered through drymad cloth. The solution was allowed to percolate into a column containing mixed bed resins, preheated with water to 80° C. The solution was concentrated and dried to give a gelatine exhibiting the following characteristics:

Bloom: 370; Cr(III): 0.2% by wt.; ashes content: 1.5% by wt.; moisture content: 10% by wt.

EXAMPLE 3

Gelatine Dialysis, Concentration and Drying

The gelatine solution obtained by filtration as per example 1 was collected in a tank and thermostated at 50° C. The solution was dialysed by an ultrafiltration unit with a membrane with cut-off of approx 6000 to separate the gelatine from the hydrolysing agent and chromium, once the retentate (gelatine) volume had been reduced by 50%, and osmosized water at 50° C. had been added portionwise in a 1:2 ratio by vol. to favour the dialysis of citric acid and of chromium. Finally, the retentate was further reduced.

Dialysis gave:

a gelatine with a citric acid residue of 0.2% by wt. and a chromium residue of 0.01% by wt.;

a permeate with a citric acid content of approx. 0.2% by wt. and a chromium content of 0.005% by wt.

The gelatine solution obtained by dialysis was concentrated to give a semi-firm gelatine with 12.5% glue weight as well as distilled water that was recovered.

The semi-firm gelatine was solidified, ground and dried. Concentration gave a gelatine exhibiting the following characteristics:

Yield referred to hydrolysed shaving: 30% by wt.; Bloom: 324; moisture content: 3%; viscosity (Ostwald): 177 mpoise at 12.5%; citric acid: 5% by wt.; Cr(III): 0.2% by wt.; ashes content at 560° C.: 2.1%.

EXAMPLE 4

Citric Acid Diafiltration

The permeate obtained by gelatine dialysis as per example 3 was concentrated by means of a nanofiltration unit with membrane with cut-offs of 200 to 300, to give a permeate free from chromium, but with a small amount of recovered citric acid. Said amount is small because the process is batch type; instead a continuous process under steady-state conditions would give a higher amount of recovered citric acid.

Diafiltration gave:

a permeate free from chromium and with a citric acid content of 0.02% by wt.;

a retentate with a citric acid content of 1.4% by wt. and a chromium content of 0.039% by wt.

The permeate obtained by diafiltration was concentrated by a reverse osmosis unit. In particular, the following was obtained:
a retentate with citric acid content of 0.3% by wt.;
osmosized water with a citric acid residue of 30 ppm.

EXAMPLE 5

Acid Hydrolysis, Filtration and Dialysis

A laboratory flask was fed with shaving (50 g) containing 56% moisture and approx. 2% trivalent chromium, and with a 4–5% citric acid solution (600 ml). The mass was hydrolysed (99%) at approx. 50° C. for 30 hrs. under stirring by an anchor stirrer, diluted with distilled water (1:1) at room temperature and filtered through drymad cloth. The filtered solution was dialysed by ultrafiltration with dialysis cell with addition of distilled water (3 l) at 50° C. The solution was concentrated and dried to give a gelatine exhibiting the following characteristics:
Bloom: approx. 370; Cr(III): 0.4% by wt.; ashes content: 2% by wt.; moisture content: 6% by wt.

EXAMPLE 6

Selective Regeneration of Resins Columns

Once the gelatine sample had been desalted as per Example 1, the anion resin column was regenerated with a solution consisting of 30% NaOH and distilled water heated to 60° C., in a 1:5 ratio by vol. The column was washed with low-flow-rate distilled water and then with high-flow-rate distilled water. Eluates were collected to obtain a concentrated eluate (core) rich in trivalent chromium.

The head and tail, which consisted of aqueous eluate and, respectively, of an eluate poor in Cr, were combined to give the mother liquid which may be reused to regenerate the anion column in the successive steps:
head+tail: 40% by vol.; Cr content: 0.04%, NaOH content: 0.7%.

The "core" is the concentrate that may be utilised by salcromo manufacturers.

Core: 10% by vol.; Cr content: 0.2%, NaOH content: 0.3%.

EXAMPLE 7

Acid Hydrolysis, Filtration, Dialysis, Desalination, Diaflltration and Selective Regeneration A 200 l reactor was fed with shaving (10 kg) containing 56% moisture and approx. 2% trivalent chromium, with 20–30% by wt. citric acid solution (6 kg) and distilled water (34 kg). Shaving was allowed to hydrate at room temperature for some hours and stirred by means of an anchor stirrer. The reaction mass was heated to 20° C. with continued stirring by an anchor stirrer and slight air bubbling to favour mixing. Hydrolysis was started by steam modulation in the reactor jacket. After 2-hr heating to 80–90° C., hydrolysis of the shaving was obtained. The resulting product was diluted with distilled water in a ratio equal to 1:1 by wt. to give a solution (90 l) at 60° C., with 9% glue weight.

Filtration, which was carried out with 100 micron felt vessel mechanical bag filter and not with a centrifuge, had been preceded by a first rough filtration using a 400 micron filtering bag, and a further dilution thermostatted at 50° C. in a batch reactor. Filtration gave a 100 micron hydrolysate solution and approx. 3–4% unreacted residue (on a dry basis).

Hydrolysis yield referred to shaving as it is: 83% by wt.

The gelatine solution resulting from filtration was collected in a tank and thermostated at 50° C. The solution was dialysed by an ultrafiltration unit with a membrane with cut-off of approx 6000 to separate the gelatine from the hydrolysis agent and chromium, once the retentate (gelatine) volume had been reduced by approx. 50%, and osmosized water at 50° C. had been added portionwise in a 1:2 ratio by vol. to favour the dialysis of citric acid and of chromium. Finally, the retentate was further reduced.

Dialysis gave:
a gelatine with a citric acid residue of 0.2% by wt. and a chromium residue of 0.01% by wt.;
a permeate with a citric acid content of approx. 0.2% by wt. and a chromium content of 0.005% by wt.

Some gelatine solution obtained by dialysis was desalted by causing it to pass in two columns containing weak anion resin and strong cation resin (150 ml each). In particular, gelatine (400 ml) was diluted with distilled water (1:1) and caused to pass in two columns containing anion resin A100 and cation resin C150 (150 ml), regenerated and preheated to 80° C. with water. This operation was performed with diluted gelatine at 50° C. at a specific rate of 5 BV (Bed Volume). The resulting solution was concentrated in vacuo.

Solution drying gave a gelatine exhibiting the following characteristics:
Bloom: 436; viscosity: 153 mpoise; citric acid: n.d.; Cr(III): 0.12% by wt.; moisture content: 17%; ashes content at 560° C.: 1.5%.

The permeate obtained by gelatine dialysis was concentrated by means of a nanofiltration unit with membrane with a cut-off of 200 to 300, to give a permeate free from chromium, but with a small amount of recovered citric acid. Said amount is small because the process is batch type; instead a continuous process under steady-state conditions would give a higher amount of recovered citric acid.

Diafiltration gave:
a permeate free from chromium and with a citric acid content of 0.02% by wt.;
a retentate with a citric acid content of 1.4% by wt. and a chromium content of 0.039% by wt.

The permeate obtained by diafiltration was concentrated by a reverse osmosis unit. In particular, the following was obtained:
a retentate with a citric acid content of 0.3% by wt.;
osmosized water with a citric acid residue of 30 ppm.

Once the gelatine sample had been desalted, the anion resin column was regenerated with a solution consisting of 30% NaOH and distilled water heated to 60° C., in a 1:5 ratio by vol. The column was washed with low-flow-rate distilled water and then with high-flow-rate distilled water. Eluates were collected to obtain a concentrated eluate (core) rich in trivalent chromium.

The head and tail, which consisted of aqueous eluate and, respectively, of an eluate poor in Cr, were combined to give the mother liquid which may be reused to regenerate the anion column in the successive steps:
head+tail: 40% by vol.; Cr content: 0.04%, NaOH content: 0.7%.

The "core" is the concentrate that may be utilised by salcromo manufacturers.

Core: 10% by vol.; Cr content: 0.2%, NaOH content: 0.3%.

EXAMPLE 8

Acid Hydrolysis with Lactic and Formic Acids, Filtration and Dialysis

A laboratory flask was fed with 50 g of skin shaving containing 56% moisture and approx. 1.2% trivalent chromium, 350 ml of a formic acid solution at 9–10% and 50 ml lactic acid solution at 9%. After hydration for 1 hour, at room temperature under stirring by a anchor stirrer, the mass had been hydrolysed at 80% at approx. 90° C. for 30 min. The mass obtained after hydrolysis had been diluted 1:1 with distilled water at room temperature and then filtrated through drymad-type canvas; then the filtrated solution had been dialysed for ultrafiltration with dialysis cell adding approx. 2 lt. of distilled water at 50° C.; finally, the solution had been percolated through a column containing mixed bed-resin pre-heated with water at 80° C. After solution concentration and drying, the gelatine obtained had the following characteristics:

Bloom 360; Chrome(III) 0.2% wt./wt.; ashes 1.55% wt./wt.; moisture 10% wt./wt.

EXAMPLE 9

Acid Hydrolysis with Citric and Sulphuric Acids, Filtration and Desalination.

A laboratory flask was fed with 50 g of skin shaving, containing 41% moisture and approx. 2% trivalent chromium, 550 ml of sulphuric acid solution at approx. 2.5% and 50 ml citric acid solution at approx. 6.5%. The mass had been hydrolysed at 85% at approx. 90° C. for 90 min, under stirring by a anchor stirrer. The mass obtained after hydrolysis had been diluted 1:1 with distilled water at room temperature and then filtrated through drymad-type canvas; then the filtrated solution had been further diluted 1:1 and desalinated at 50° C. by a double step percolation through two columns containing 150 ml each weak anionic resin and strong cationic resin pre-heated with water at 80° C.

After concentration and drying of the solution, the gelatine obtained had the following characteristics:

Bloom 336; Chrome (III) 0.15% wt./wt.; ashes 1.1% wt./wt.; moisture 10% wt./wt.

EXAMPLE 10

Hydrolysis With Edta Disodium Salt and Sulphuric Acids, Filtration and Desalination.

A laboratory flask was fed with 50 g of shaving, containing 41% moisture and approx. 16% trivalent chromium, 350 ml of a sulphuric acid solution at approx. 2.5% and 350 ml salt disodium EDTA solution at approx. 2.5%. The mass had been hydrolysed at 80% at approx. 90° C. for 60 min, under stirring by a anchor stirrer. The mass obtained after hydrolysis had been diluted 1:1 with distilled water at room temperature and then filtrated through drymad-type canvas; then the filtrated solution had been further diluted 1:1 and desalinated at 50° C. by a double step percolation through two columns containing 150 ml each weak anionic resin and strong cationic resin pre-heated with water at 80° C.

After concentration and drying of the solution, the gelatine obtained had the following characteristics:

Bloom 320; Chrome (III) 0.17% wt./wt.; ashes 1.2% wt./wt.; moisture 13% wt./wt.

The claimed process entirely complies with the aforementioned objects of the present invention, i.e. the development of industrial processes, capable of recovering—from tanned hides and skins shaving—by-products (collagen gelatine and chromium) that may be recycled to and reused in industrial plants, thereby minimising the problem arising from their disposal; the obtainment of choice products of high economic value, for successive industrial applications; the development of a process having no environmental impact and, therefore, envisaging a complete reus of its by-products (hydrolysing agents, regenerants, and wastewaters) and not generating polluting gas emissions.

In this respect, it is to b noted that the envisaged and essential acid hydrolysis is very fast and gives a hydrolysate in a yield of approx. 80°/ in respect of shaving as it is, without any alkaline treatment. Finally, the hydrolysis gives a gelatine of satisfactory quality and, in any case, exhibiting a Bloom's resistance not less than 300, and does not generate gaseous by-products. Non-hydrolysed tanned hides and skins shaving products may be recycled for further hydrolysis. Said step may be repeated several times until complete, or anyhow, exhaustive hydrolysis of the starting material without detriment to the gelatine qualitative yields. The successive hydrolysis cycles, in fact, give technical-grade gelatines exhibiting constant qualitative chacteristics.

The hydrolysate consisting of gelatine, hydrolysing agent and chromium salts is separated in successive separation steps to give three main products: gelatine, regenerated hydrolysing agent and chromium salts in solution.

All products are further processed and recovered: in particular, the gelatine is marketed; the chromium salts are utilised by saicromo manufacturers for tanning and, therefore, is reused industrially; the hydrolysing agent, the ion-exchange-columns regenerant and water are continuously recycled.

It is of major importance that the process never uses polluting agents and does not generate liquid or gaseous emissions: therefore, it is ecofriendly. Only gelatine drying brings about a low water loss. A further, but not secondary feature related to the environmental impact of the process is that—unlike the processes for protein hydrolysates production by alkaline hydrolysis—the process degradation of the amidic group does not produce ammonia.

Numerous variations and modifications may be effected without departing from the spirit and scope of the novel concept of the invention. Therefore, the claimed process may be modified and perfected by those skilled in the art, according to the technical knowledge and experience gained in the sector as well as to the normal evolution of the state of the art.

The invention claimed is:

1. Process for gelatine production and chromium salts recovery from tanned hides and skins shaving products, comprising at least by the following steps:
   organic acid hydrolysis at temperatures to 100° C., excluding room temperature;
   extraction by filtration of the raw gelatine obtained after hydrolysis;
   technical-grade gelatine and chromium salts separation by desalination.

2. The process as claimed in claim 1 wherein the organic acid hydrolysis is characterised by:
   the use of organic acids selected from the group consisting selected from the group consisting of monocarboxylic, polycarboxylic, hydroxy acids, the salts and mixtures thereof;

a ratio of 10 to 80% wt./wt. of said acids to the shaving products with an average moisture content of approx. 55%;

a water weight ratio ranging from 4 to 10 times the weight of the shaving products with an average moisture content of approx. 55% mass heating to a temperature ranging from 50° C. to 100° C.

3. The process as claimed in claim 1 and 2, wherein the organic acids are combined with mineral acids, in a ratio of 5 to 20% wt./wt. of said mineral acids to the shaving products with an average moisture content of approx. 55%.

4. The process as claimed in any of claims 1 to 3 wherein the organic acids are formic, lactic, citric, EDTA, tartaric acids, the salts and mixtures thereof.

5. The process as claimed in any of claims 1 to 4, wherein the mineral acids are selected from the group consisting of sulphuric and phosphoric acids.

6. The process as claimed in claim 2, wherein the time of mass residence under the selected temperature conditions is ranging from 0.5 to 30 hrs.

7. The process as claimed in claim 1, wherein the raw gelatine extraction is characterised by mass filtration after dilution.

8. The process as claimed in claim 7, wherein the filtration for raw gelatine extraction is obtained using mechanical filtering means, selected from centrifugal separators, drum filters, bag filters, filter press, rotational separators.

9. The process as claimed in any of claims 1 to 8 wherein the acid hydrolysis and filtration are repeated until complete gelatine extraction.

10. The process as claimed in claim 1, wherein the gelatine and chromium salts separation is characterised by on or more desalinations over ion, cation and anion or mixed-bed, exchange resins selective for trivalent Cr.

11. The process as claimed in any of claims 1 to 10, comprising the following further steps:
gelatine and chromium salts separation by dialysis after filtration;
chromium salts separation by diafiltration, after dialysis, with additional hydrolysing agent recovery and recycling.

12. The process as claimed in claim 11, wherein dialysis is performed across porous membranes with molecular sieve of 1,000 to 30,000 dalton.

13. The process as claimed in claim 11, wherein diafiltration is performed through porous membranes with molecular sieve of 200 to 500 dalton.

14. The process as claimed in any of claims 1 to 13, comprising the following further step:
ion exchange filters selective regeneration for total chromium recovery.

15. The process as claimed in claim 14, wherein the ion exchange resins selective regeneration is obtained with acid and alkaline regenerants and successive washings and gives a head poor in regenerant and chromium salts, a core poor in regenerant, but rich in chromium salts, which forms the concentrated phase of chromium recovery, and a tail rich in regenerant and poor in chromium salts.

16. The process as claimed in claim 15, wherein the head poor in regenerant and chromium salts and the tail rich in regenerant and poor in chromium salts are combined to recover the regenerant to be reused in the successive ion exchange columns regenerations.

17. The process as claimed in any of claims 1 to 16, comprising all the following steps:
organic acid hydrolysis at temperatures to 100° C., excluding room temperature;
extraction by filtration of the raw gelatine obtained after acid hydrolysis;
gelatine and chromium salts separation by dialysis after filtration;
technical-grade gelatine and chromium salts separation by desalination after dialysis;
ion exchange filters selective regeneration for total chromium recovery;
chromium salts separation by diafiltration, after dialysis, with the addition hydrolysing agent recovery and recycling.

18. The process as claimed in any preceding claims, wherein the gelatine solutions obtained by desalination and/or dialysis are recovered and concentrated.

19. The process as claimed in any preceding claims, wherein the chromium salts solutions obtained by desalination and/or diafiltration and/or ion exchange resins selective regeneration, are recovered and concentrated.

20. The process as claimed in any preceding claims, wherein the phases containing the hydrolysing agent obtained by desalination and/or diafiltration are recovered and recycled.

21. The process as claimed in any preceding claims, wherein the water recovered during gelatine and chromium salts concentration is recycled.

* * * * *